United States Patent [19]
Lutes

[11] Patent Number: 5,673,016
[45] Date of Patent: Sep. 30, 1997

[54] MULTIFUNCTION VISITOR INFORMATION SYSTEM

[76] Inventor: Daniel M. Lutes, 446 McCombs Rd., Venetia, Pa. 15367

[21] Appl. No.: 502,475

[22] Filed: Jul. 14, 1995

[51] Int. Cl.$^6$ .................................................. G08B 27/00
[52] U.S. Cl. ........................ 340/326; 340/541; 340/565; 340/330
[58] Field of Search ............................. 340/326, 330, 340/331, 332, 311.1, 286.11, 541, 387.1, 396.1, 565, 691, 692, 693; 379/102, 103

[56] References Cited

U.S. PATENT DOCUMENTS

| | | | |
|---|---|---|---|
| 3,484,561 | 12/1969 | Matthews | 379/103 |
| 3,916,401 | 10/1975 | Freeman | 340/666 |
| 4,023,151 | 5/1977 | Markham | 340/692 |
| 4,144,529 | 3/1979 | Miller et al. | 340/562 |
| 4,764,953 | 8/1988 | Chern et al. | 379/355 |
| 4,851,811 | 7/1989 | Vallat et al. | 340/326 |
| 4,853,678 | 8/1989 | Bishop, Jr. et al. | 340/573 |
| 4,855,723 | 8/1989 | Fritz et al. | 340/330 |
| 4,868,540 | 9/1989 | Housley | 340/326 |
| 4,931,780 | 6/1990 | LaMont et al. | 340/326 |
| 4,951,045 | 8/1990 | Knapp et al. | 340/944 |
| 5,280,266 | 1/1994 | Kao | 340/330 |
| 5,303,300 | 4/1994 | Eckstein | 379/103 |
| 5,315,639 | 5/1994 | Lassers | 379/66 |
| 5,321,742 | 6/1994 | Stevens | 379/103 |
| 5,521,578 | 5/1996 | DelValle | 340/326 |

*Primary Examiner*—Jeffery Hofsass
*Assistant Examiner*—Ashok Mannava

[57] ABSTRACT

A multifunction visitor information system for use in association with a building structure including an electrical system, intercom system, door bell system, security system and telephone system, the apparatus comprising: a central control unit formed in a planar configuration with an essentially hollow interior, the control unit being couplable to a desired mounting surface, the control unit including at least one light, a liquid crystal display panel including means for displaying a plurality of different messages for viewing by visitors to a building structure, the liquid crystal display panel and each light being electrically coupled to the electrical system of a building structure; and a plurality of function buttons being positioned within the display unit and operatively coupled to the liquid crystal display panel, the function buttons permitting users to send a plurality of different coded sequences to the panel thereby causing different messages to be displayed on the panel.

1 Claim, 4 Drawing Sheets

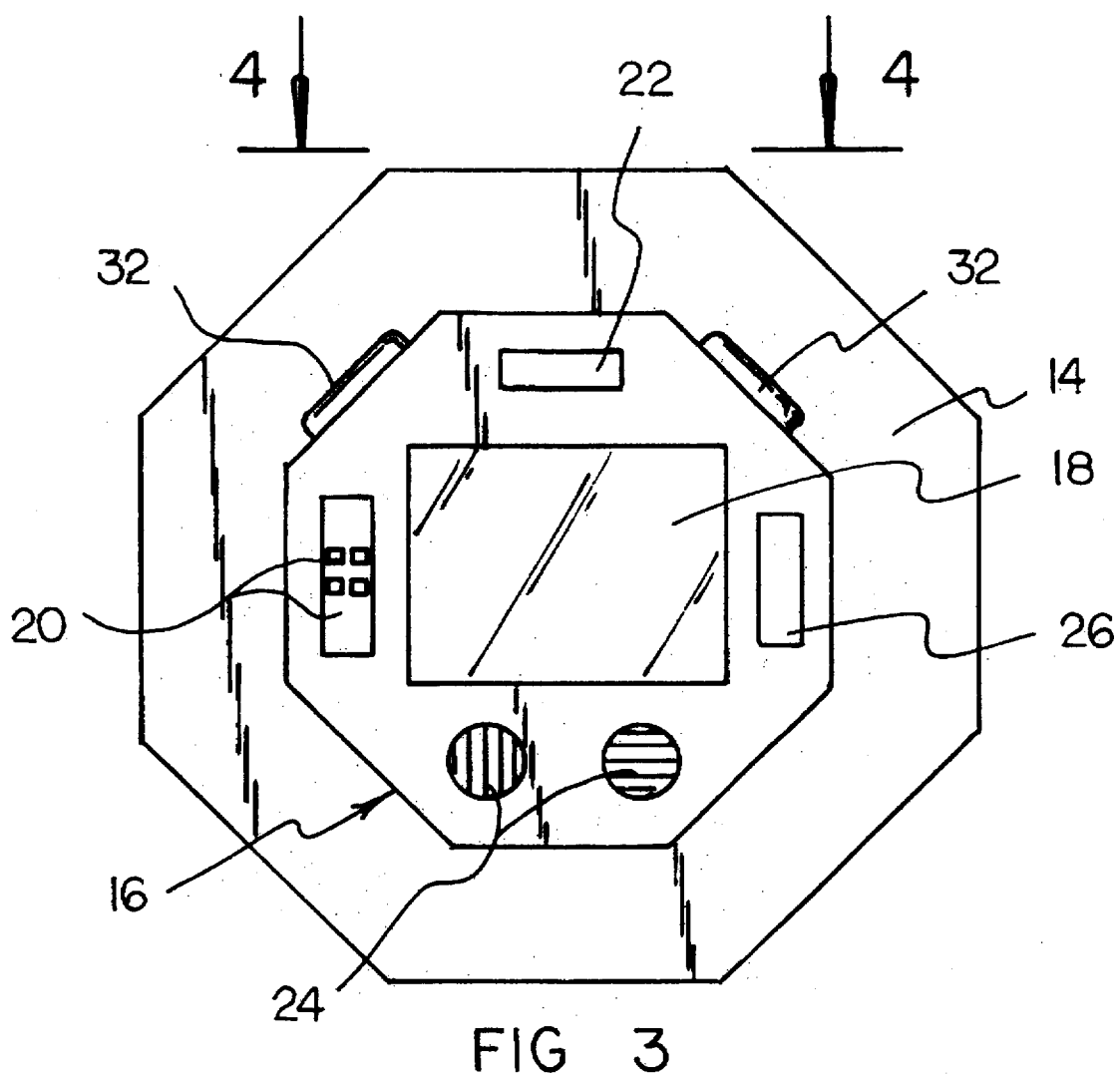
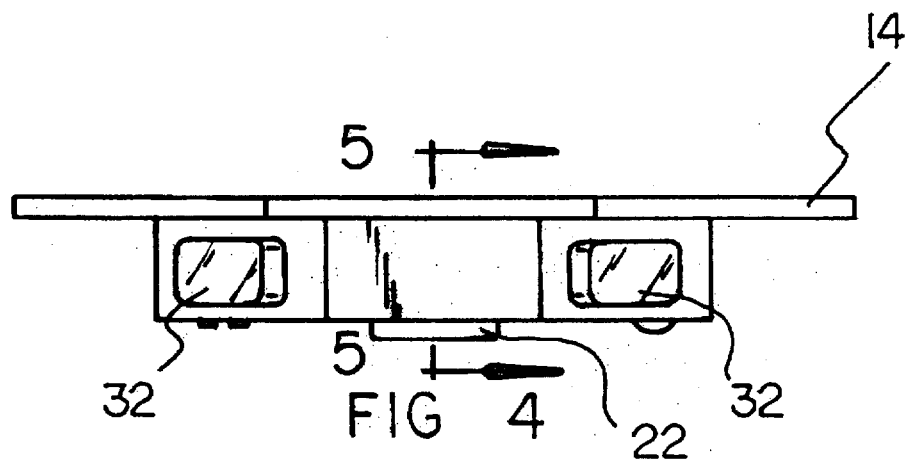

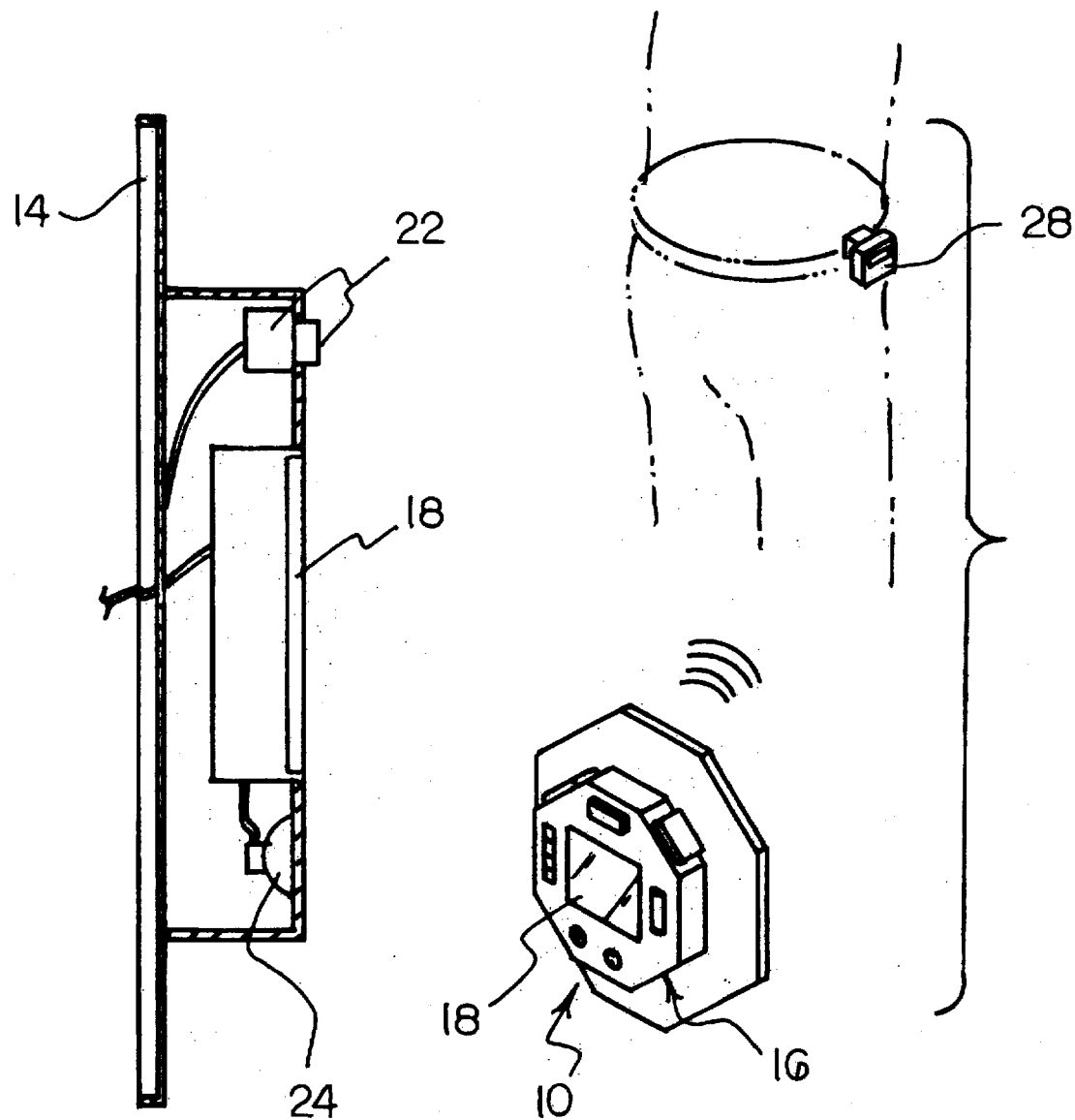

MULTIFUNCTION VISITOR INFORMATION SYSTEM

BACKGROUND OF THE INVENTION

1. Field of the Invention

The present invention relates to a multifunction visitor information system and more particularly pertains to providing visitors to a residence or business with a plurality of information and communication options.

2. Description of the Prior Art

The use of door answering devices is known in the prior art. More specifically, door answering devices heretofore devised and utilized for the purpose of communicating with visitors approaching the entrance of a structure are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,148,468 to Marrick a door answering system.

U.S. Pat. No. 5,303,300 to Eckstein discloses a security door phone device.

U.S. Pat. No. 5,321,742 to Stevens discloses. a entry door answering telephone system.

U.S. Pat. No. 5,315,639 to Lassers discloses a hands-free intercom system.

U.S. Pat. No. 3,484,561 to Mathews discloses an apartment telephone intercom and door release system.

Lastly, U.S. Pat. No. 4,764,953 to Chern discloses a method and apparatus for remote doorbell answering.

In this respect, the multifunction visitor information system according to the present invention substantially departs from the conventional concepts and designs of the prior art, and in doing so provides an apparatus primarily developed for the purpose of providing visitors to a residence or business with a plurality of information and communication options.

Therefore, it can be appreciated that there exists a continuing need for a new and improved multifunction visitor information system which can be used for providing visitors to a residence or business with a plurality of information and communication options. In this regard, the present invention substantially fulfills this need.

SUMMARY OF THE INVENTION

In view of the foregoing disadvantages inherent in the known types of door answering devices now present in the prior art, the present invention provides an improved multifunction visitor information system. As such, the general purpose of the present invention, which will be described subsequently in greater detail, is to provide a new and improved multifunction visitor information system and method which has all the advantages of the prior art and none of the disadvantages.

To attain this, the present invention essentially comprises a new and improved multifunction visitor information system comprising, in combination: a building structure including an electrical system, intercom system, door bell system, security system and telephone system; a base plate formed in a planar generally octogonal configuration, the plate having a front face including a scenic design around its periphery and a rear face including coupling means to permit affixation to a desired mounting surface; a central control unit formed in a planar generally octogonal configuration, the control unit having a smaller length and width than the base plate, the control unit having a greater thickness than the base plate and including an essentially hollow interior, the control unit being coupled to the approximate centerpoint of the front surface of the base plate, the control unit including a light positioned at opposite sides thereof, the lights being electrically coupled to the electrical system of a building structure; a liquid crystal display panel including means for displaying a plurality of different messages for viewing by visitors to a building structure, the panel being positioned at the approximate centerpoint of the central control unit, the panel being electrically coupled to the electrical system of the building structure; a plurality of function buttons being positioned within the display unit and operatively coupled to the liquid crystal display panel, the function buttons permitting users to send a plurality of different coded sequences to the panel thereby causing different messages to be displayed on the panel; a door bell being positioned within the central control unit, the door bell being operatively coupled to the door bell system of the building structure, the door bell being depressed by a user to activate the door bell system; a speaker and microphone assembly being positioned within the central display unit, the speaker and microphone assembly being electrically coupled to the intercom system and telephone system of a building structure, the speaker and microphone assembly permitting two-way communication between a visitor and occupant of the building structure; a motion detector being positioned within the central display unit, the motion detector being operatively coupled to the liquid crystal display, speaker and microphone assembly and security system, the motion detector activating the liquid crystal display, speaker and microphone assembly and security system when visitors or intruders approach the central display unit; and electronic signal transmission means being included in the liquid crystal display panel and operatively coupled to the speaker and microphone assembly and motion detector, a beeper device having a sound emmiting component and including means to recieve an electronic signal from the electronic transmission means thereby activating the sound emmitting component.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved multifunction visitor information system which has all of the advantages of the prior art door answering devices and none of the disadvantages.

It is another object of the present invention to provide a new and improved multifunction visitor information system which may be easily and efficiently manufactured and marketed.

It is further object of the present invention to provide a new and improved multifunction visitor information system which is of durable and reliable constructions.

An even further object of the present invention is to provide a new and improved multifunction visitor information system which is susceptible of a low cost of manufacture with regard to both materials and labor, and which accordingly is then susceptible of low prices of sale to the consuming public, thereby making such multifunction visitor information system economically available to the buying public.

Still yet another object of the present invention is to provide a new and improved multifunction visitor information system which provides in the apparatuses and methods of the prior art some of the advantages thereof, while simultaneously overcoming some of the disadvantages normally associated therewith.

Still another object of the present invention is to providing visitors to a residence or business with a plurality of information and communication options.

Lastly, it is an object of the present invention to provide a new and improved a multifunction visitor information system for use in association with a building structure including an electrical system, intercom system, door bell system, security system and telephone system, the apparatus comprising: a central control unit formed in a planar configuration with an essentially hollow interior, the control unit being couplable to a desired mounting surface, the control unit including at least one light, a liquid crystal display panel including means for displaying a plurality of different messages for viewing by visitors to a building structure, the liquid crystal display panel and each light being electrically coupled to the electrical system of a building structure; and a plurality of function buttons being positioned within the display unit and operatively coupled to the liquid crystal display panel, the function buttons permitting users to send a plurality of different coded sequences to the panel thereby causing different messages to be displayed on the panel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a front perspective view of the apparatus shown in FIG. 2.

FIG. 4 is a top plan view of the apparatus taken along section line 4 of FIG. 3.

FIG. 5 is a cross sectional view taken along section line 5 of FIG. 4.

FIG. 6 is a perspective view of the apparatus illustrating the beeper device secured to the belt of a user.

The same reference numerals refer to the same parts through the various Figures.

DESCRIPTION OF THE PREFERRED EMBODIMENT

Figure 1:
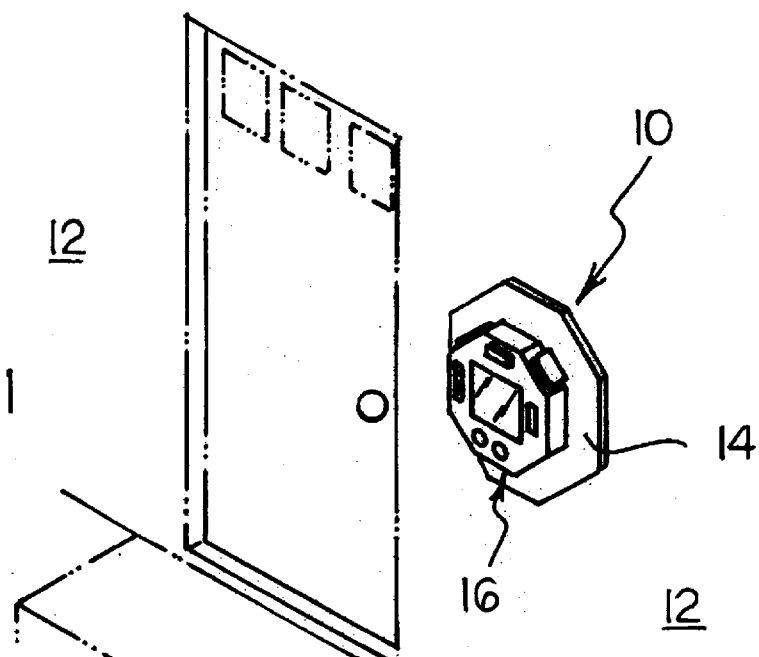
FIG. 1 is a perspective view of the preferred embodiment of the multifunction visitor information system constructed in accordance with the principles of the present invention.

With reference now to the drawings, and in particular to FIG. 1 thereof, the preferred embodiment of the new and improved multifunction visitor information system embodying the principles and concepts of the present invention and generally designated by the reference numeral 10 will be described.

The present invention, the multifunction visitor information system 10 is comprised of a plurality of components. Such components in their broadest context include a building structure 12, a base plate 14, a central control unit 16, a liquid crystal display panel 18, a plurality of function buttons 20, a door bell 22, a speaker and microphone assembly 24, a motion detector 26 and a beeper device 28. Such components are individually configured and correlated with respect to each other so as to attain the desired objective.

More specifically, the building structure 12 may be of a residential or commercial nature. A residential of the apparatus. The residential housing structure includes an electrical system, an intercom system, a door bell system, a security system and a telephone system. In alternative embodiments of the apparatus the multifunction visitor information system does not include a building structure. Rather, in such embodiments the apparatus is adapted to be operatively coupled to the electrical system, intercom system, door bell system, security system and telephone system of an existing residential or commercial structure.

The first component of the apparatus is a base plate 14 formed in a planar generally octogonal configuration. The plate has a front face which includes a scenic design around its periphery. Various embodiments of the apparatus include plates having different scenic designs to conform to the specific season of the year. Further embodiments of the apparatus are fabricated of plastic, wood or metal and shaped in a plurality of different configurations. The rear face includes coupling means to permit affixation to a desired mounting surface. The most common mounting surface is the external wall of a house adjacent to its door frame. Other potential mounting surfaces are gates and light posts. Note FIGS. 1, 3 and 5.

A central control unit 16 is formed in a planar generally octogonal configuration. In varying embodiments of the apparatus the components are fabricated of wood, plastic and metal materials. In varying embodiments the control unit is fabricated in a plurality of different shapes and sizes. The control unit has a smaller length and width than the base plate. The control unit has a greater thickness than the base plate and includes an essentially hollow interior. The various components of the apparatus are positioned partially within the hollow interior of the control unit. Note FIGS. 1 and 5.

The control unit is coupled to the approximate centerpoint of the front face of the base plate. The control unit includes a light 32 positioned at opposite sides of the unit. This configuration illuminates the entire panel thereby permitting use of the apparatus during poor lighting conditions. In alternative embodiments of the apparatus the lights are colored in a variety of different hues to suit the esthetic tastes of different users. The lights are electrically coupled to the electrical system of the building structure. In the preffered embodiment the coupling method is a plurality of electrically conductive wires. Note FIGS. 3 and 4.

Figure 2:
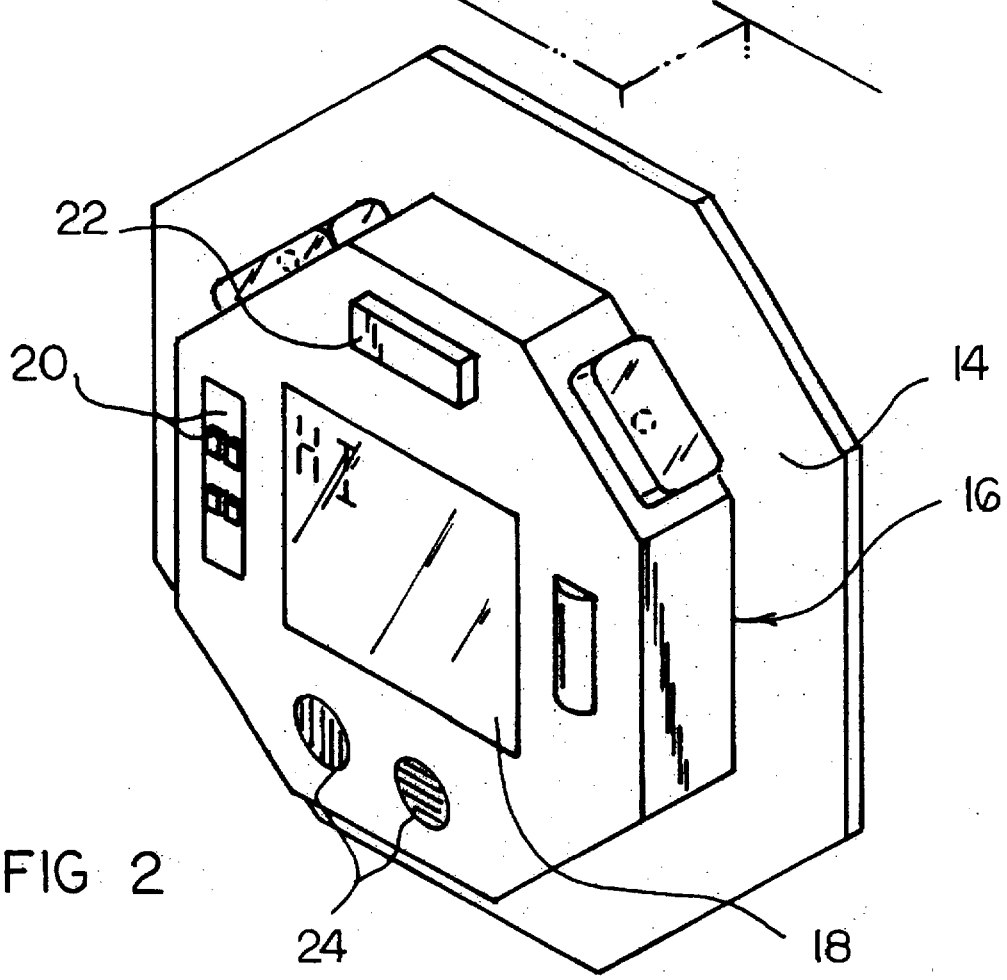
FIG. 2 is an isolated perspective view of the apparatus shown in FIG. 1.
Figure 7:
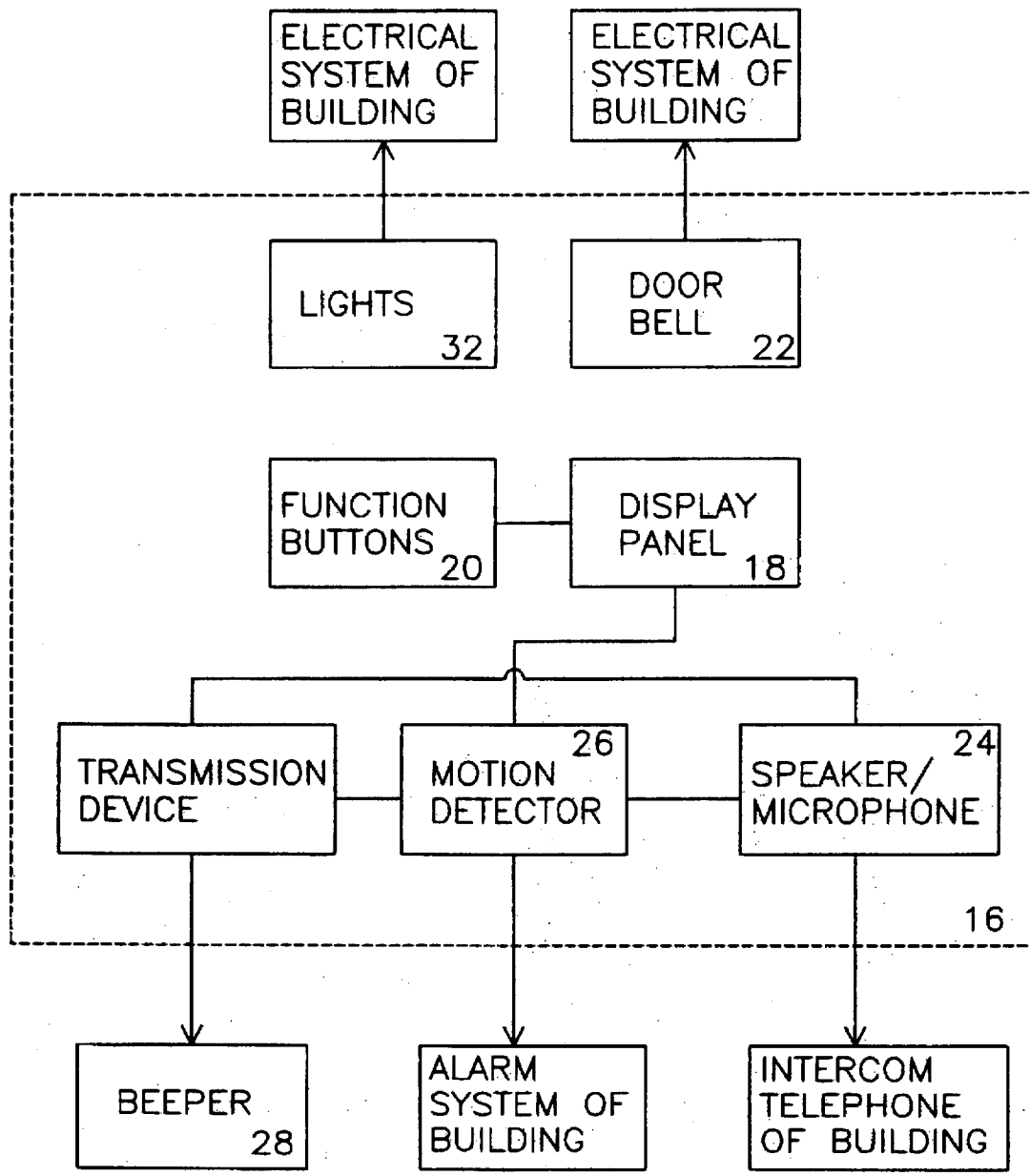
FIG. 7 is a schematic diagram depicting the interconnection of components of the present invention.

A liquid crystal display panel 18 includes means for displaying a plurality of different messages for viewing by visitors to a building structure. The messages are preprogrammed into the panel. Different messages are displayed when different codes are inserted from the function keys. Visitors possessing a particular code will receive messages which the owners of the apparatus deem appropriate. The panel is positioned at the approximate centerpoint of the central control unit for easy viewing. The panel is electrically coupled to the electrical system of the building structure. In the preffered embodiment the coupling method is a plurality of electrically conductive wires. Note FIGS. 2 and 3.

A plurality of function buttons 20 are positioned within the display unit and operatively coupled to the liquid crystal display panel. The function buttons permit users to send a plurality of different coded sequences to the panel thereby causing different messages to be displayed on the panel. In the preffered embodiment the function keys include numerals on each button. This configuration provides an easy way for users to remember and insert their respective assigned codes. Note FIGS. 2 and 3

A door bell 22 is positioned within the central control unit. The door bell is operatively coupled to the door bell system of the building structure. The door bell is depressed by a user to activate the door bell system. This feature of the apparatus provides visitors with a conventional means of alerting occupants of a residential dwelling or business of the their presence. Note FIGS. 4 and 5.

A speaker and microphone assembly 24 is positioned within the central display unit. The speaker and microphone assembly is electrically coupled to the intercom system and telephone system of a building structure. The speaker and microphone assembly permits two-way communication between a visitor and occupant of the building structure. This feature permits use of the apparatus as a standard intercom system. Additionally, the apparatus permits a direct communication link with the telephone system of the building structure. This feature is particularly useful in commercial settings. Note FIGS. 3 and 5.

A motion detector 26 is positioned within the central display unit. The motion detector is operatively coupled to the liquid crystal display, speaker and microphone assembly and security system. The motion detector activates the liquid crystal display, speaker and microphone assembly and security system when visitors or intruders approach the central display unit. The liquid crystal display can be programmed to display a particular greeting such as "HI" when a visitor approaches. The security system can be set so that movement detected by the motion detector will cause the system to alert the occupants of the structure. Note FIGS. 1 and 2.

Electronic signal transmission means are included in the liquid crystal display and operatively coupled to the speaker and microphone assembly and motion detector. A beeper device 28 has a sound emmiting component and includes means to recieve an electronic signal from the transmition means thereby activating the sound emmitting component. The beeper device includes coupling means to permit affixation to a user's belt or pocket. The beeper device is particularly useful for use in building structures which do not include an intercom system. In such structures the beeper device provides a convenient means of notifying users of a visitor's arrival. Note FIG. 6.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved multifunction visitor information system comprising, in combination:

a building structure including an electrical system, intercom system, door bell system, security system and telephone system;

a base plate formed in a planar generally octagonal configuration, the plate having a front face including a scenic design around its periphery and a rear face including coupling means to permit affixation to a desired mounting surface;

a central control unit formed in a planar generally octagonal configuration, the control unit having a smaller length and width than the base plate, the control unit having a greater thickness than the base plate and including an essentially hollow interior, the control unit being coupled to the approximate centerpoint of the front surface of the base plate, the control unit including a light positioned at opposite sides thereof, the lights being electrically coupled to the electrical system of a building structure;

a liquid crystal display panel including means for displaying a plurality of different messages for viewing by visitors to a building structure, the panel being positioned at the approximate centerpoint of the central control unit, the panel being electrically coupled to the electrical system of the building structure;

a plurality of function buttons being positioned within the display unit and operatively coupled to the liquid crystal display panel, the function buttons permitting users to send a plurality of different coded sequences to the panel thereby causing different messages to be displayed on the panel;

a door bell being positioned within the central control unit, the door bell being operatively coupled to the door bell system of the building structure, the door bell being depressed by a user to activate the door bell system;

a speaker and microphone assembly being positioned within the central display unit, the speaker and microphone assembly being electrically coupled to the intercom system and telephone system of a building structure, the speaker and microphone assembly permitting two-way communication between a visitor and occupant of the building structure;

a motion detector being positioned within the central display unit, the motion detector being operatively coupled to the liquid crystal display, speaker and microphone assembly and security system, the motion detector activating the liquid crystal display, speaker and microphone assembly and security system when visitors or intruders approach the central display unit, wherein the liquid crystal display depicts a greeting upon the detection of a visitor; and electronic signal transmission means being included in the liquid crystal display panel and operatively coupled to the speaker and microphone assembly and motion detector, a beeper device having a sound emitting component and including means to receive an electronic signal from the electronic transmission means thereby activating the sound emitting component.

* * * * *